US010277166B2

(12) United States Patent
Hu

(10) Patent No.: US 10,277,166 B2
(45) Date of Patent: Apr. 30, 2019

(54) MULTIFUNCTIONAL SOLAR ENERGY SYSTEM

(71) Applicant: BOLY MEDIA COMMUNICATIONS (SHENZHEN) CO., LTD., Shenzhen (CN)

(72) Inventor: Xiaoping Hu, Shenzhen (CN)

(73) Assignee: BOLY MEDIA COMMUNICATIONS (SHENZHEN) CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/578,681

(22) PCT Filed: May 27, 2016

(86) PCT No.: PCT/CN2016/083621
§ 371 (c)(1),
(2) Date: Nov. 30, 2017

(87) PCT Pub. No.: WO2016/192588
PCT Pub. Date: Dec. 8, 2016

(65) Prior Publication Data
US 2018/0159465 A1 Jun. 7, 2018

(30) Foreign Application Priority Data
Jun. 1, 2015 (CN) .......................... 2015 1 0291476

(51) Int. Cl.
*H01L 25/00* (2006.01)
*H02S 40/44* (2014.01)
(Continued)

(52) U.S. Cl.
CPC .............. *H02S 40/44* (2014.12); *F24S 20/30* (2018.05); *F24S 23/31* (2018.05); *F24S 23/71* (2018.05);
(Continued)

(58) Field of Classification Search
CPC .......... H02S 40/44; H02S 40/22; H02S 10/20; H02S 10/00; H02S 20/30; F24S 23/30; F24S 23/31
(Continued)

(56) References Cited

U.S. PATENT DOCUMENTS

2005/0081909 A1* 4/2005 Paull ...................... H01L 31/052
136/246
2008/0066799 A1* 3/2008 Clark .................. H01L 31/0543
136/246
(Continued)

FOREIGN PATENT DOCUMENTS

CN 101943484 A 1/2011
WO 2012020146 A1 2/2012

OTHER PUBLICATIONS

International Search Report for PCT/CN2016/083621, dated Sep. 1, 2016, and its English translation provided by WIPO.
(Continued)

Primary Examiner — Jayne L Mershon
(74) Attorney, Agent, or Firm — Ladas & Parry, LLP

(57) ABSTRACT

Disclosed is a multifunctional solar energy system comprising a converging system and two solar energy utilization devices (P1, P2), wherein the converging system comprises at least one light-focusing refractive surface (s1) and one reflective surface (s2); at least one of the reflective surface (s2) and the two solar energy utilization devices (P1, P2) are movable; if the reflective surface (s2) is movable, the two solar energy utilization devices (P1, P2) are respectively provided on light paths before and after the reflective surface (s2) moves; and if the reflective surface (s2) is fixed, the two solar energy utilization devices (P1, P2) are successively provided in the light path after the reflective surface (s2). The solar energy system is able to place one of the two solar energy utilization devices (P1, P2) in the light path by
(Continued)

moving the movable component so as to respectively use the two solar energy utilization devices (P1, P2) at different times, thereby greatly extending the function of the solar energy system and improving the comprehensive utilization rate of the system.

10 Claims, 5 Drawing Sheets

(51) Int. Cl.
    *H02S 40/22*     (2014.01)
    *H02S 10/20*     (2014.01)
    *H02S 20/30*     (2014.01)
    *F24S 23/30*     (2018.01)
    *H02S 10/00*     (2014.01)
    *F24S 23/71*     (2018.01)
    *F24S 70/65*     (2018.01)
    *F24S 23/74*     (2018.01)
    *F24S 50/80*     (2018.01)
    *F24S 20/30*     (2018.01)
    *F24S 20/20*     (2018.01)
(52) U.S. Cl.
    CPC ............... *F24S 23/74* (2018.05); *F24S 50/80* (2018.05); *F24S 70/65* (2018.05); *H02S 10/00* (2013.01); *H02S 10/20* (2014.12); *H02S 20/30* (2014.12); *H02S 40/22* (2014.12); *F24S 2020/23* (2018.05); *Y02E 10/40* (2013.01); *Y02E 10/52* (2013.01); *Y02E 10/60* (2013.01)
(58) Field of Classification Search
    USPC ........................................................ 136/246
    See application file for complete search history.

(56) References Cited

U.S. PATENT DOCUMENTS

| | | | |
|---|---|---|---|
| 2011/0298993 A1* | 12/2011 | Hirata | B29D 11/00269 348/744 |
| 2013/0139805 A1 | 6/2013 | Peris Domingo et al. | |
| 2014/0246075 A1* | 9/2014 | Goldsby | H01L 31/0521 136/246 |
| 2015/0053253 A1 | 2/2015 | O'Neill | |
| 2015/0372636 A1* | 12/2015 | Menard | H02S 20/32 136/246 |
| 2015/0380585 A1* | 12/2015 | Sethi | H01L 31/048 136/259 |

OTHER PUBLICATIONS

Written Opinion of the International Search Authority for PCT/CN2016/083621, dated Sep. 1, 2016, and its English translation from Bing.com Microsoft Translator.

* cited by examiner

MULTIFUNCTIONAL SOLAR ENERGY SYSTEM

CROSS-REFERENCE TO RELATED APPLICATIONS

The present application is the U.S. national phase of PCT Application No. PCT/CN2016/083621 filed on May 27, 2016 entitled "MULTIFUNCTIONAL SOLAR ENERGY SYSTEM", which claims priority to Chinese Patent Application No. 201510291476.X filed on Jun. 1, 2015, the disclosures of which are incorporated in their entireties by reference herein.

TECHNICAL FIELD

The present invention relates to the technical field of clean energy, and in particular relates to a multifunctional solar energy system that utilizes solar energy.

BACKGROUND

With increasing emphasis on environmental protection, solar energy systems have found increasingly wider application. At present, common solar energy systems mostly have a single function, such as a solar hot water system that performs photothermal conversion, and a solar power generation system that performs photoelectric conversion.

In human activities, however, there are often different needs at different time. For example, food needs to be heated or cooked at mealtime, and electricity is required at other time. As such, solar energy systems with a single function can hardly meet the needs in various aspects.

SUMMARY OF THE INVENTION

A multifunctional solar energy system is provided according to the present invention, including a converging system and two solar energy utilization devices, wherein the converging system includes at least one light-focusing refractive surface and one reflective surface, which is arranged below the light-focusing refractive surface along a solar incident direction; the two solar energy utilization devices are used for absorbing and utilizing sunlight; at least one of the reflective surface and the two solar energy utilization devices is movable; if the reflective surface is movable, the two solar energy utilization devices are respectively provided on the light paths formed before and after the reflective surface is moved; and if the reflective surface is fixed, the two solar energy utilization devices are successively provided on the light path after the reflective surface.

The multifunctional solar energy system according to the present invention has at least one movable component, i.e. the reflective surface or one of the two solar energy utilization devices. One of the two solar energy utilization devices are placed onto the light path by moving the movable component, so that the two solar energy utilization devices can be used at different time respectively. This extends the function of the solar energy system manyfold with only slightly increased cost, thereby improving the comprehensive utilization rate of the system, and being conducive to more fully utilizing natural clean energy.

Specific examples according to the present invention are described in detail below in conjunction with the accompanying drawings.

DETAILED DESCRIPTION OF THE EMBODIMENTS

Figure 1:
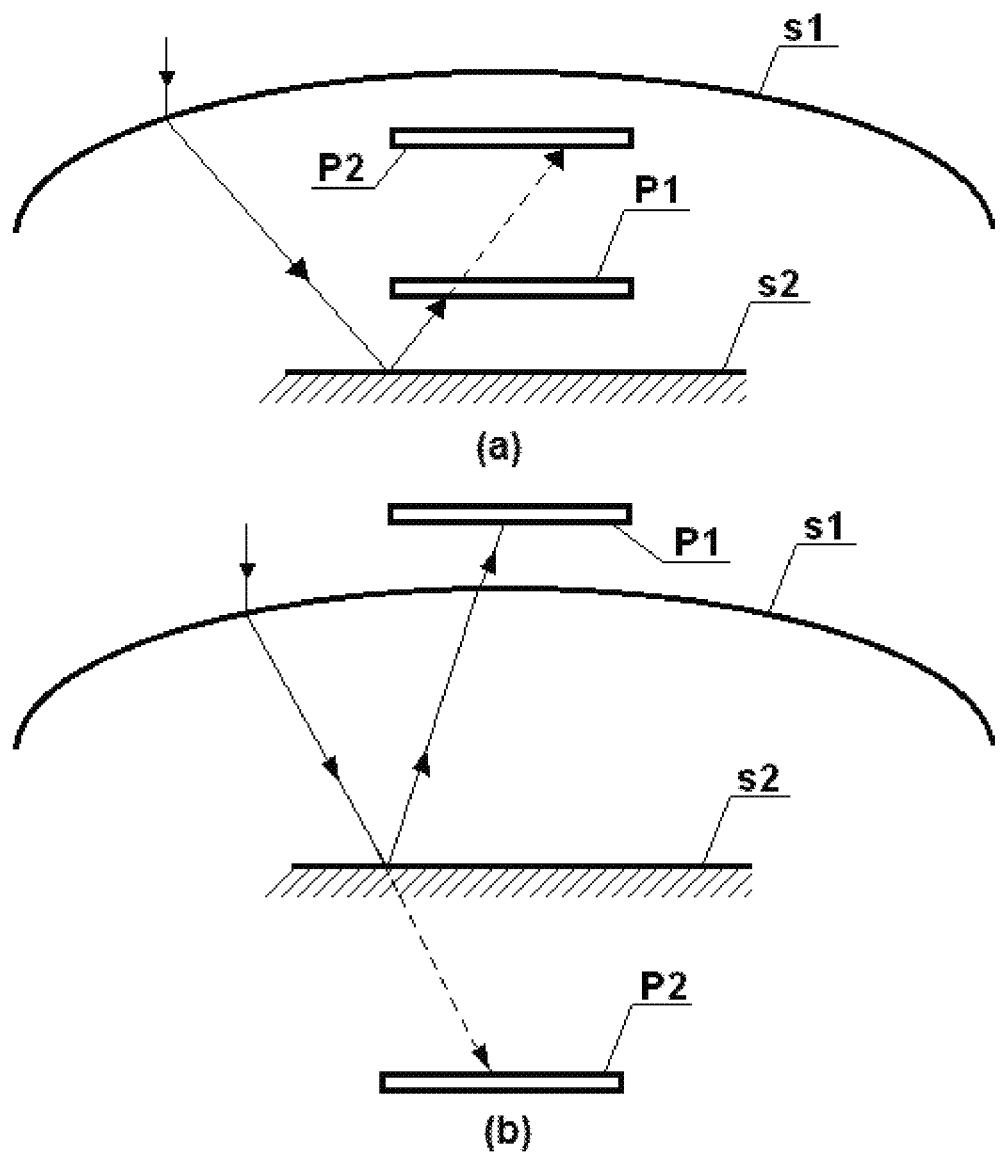
FIG. 1 is a schematic diagram of a basic structure of a multifunctional solar energy system according the present invention.

Referring to FIG. 1 for a basic structure of a multifunctional solar energy system according the present invention, it includes a converging system and two solar energy utilization devices P1 and P2. The converging system includes at least one light-focusing refractive surface s1 and one reflective surface s2, which is arranged below the light-focusing refractive surface along a solar incident direction. At least one of s2, P1 and P2 is movable.

In a very simple situation, s1 and s2 can be provided by a same physical element. For example, for a converging lens coated with a reflecting film on one side, the film coated surface is the reflective surface, and the other side is the light-focusing refractive surface. In this case, the movable component is one of the two solar energy utilization devices, which are both arranged above the light-focusing refractive surface.

Generally, s1 and s2 can be provided by separate physical elements, and the element providing the reflective surface can also have convergence capability to further improve the light focusing ability of the system. In other words, the converging system can have more than two light-focusing refractive surfaces, which can be combined with each other or combined with the reflective surface to form different combinations of physical elements.

If the reflective surface is fixed, the two solar energy utilization devices are successively provided on the light path after the reflective surface, as shown in FIG. 1(a). In this case, P1 is movable, and when P2 needs to be used, P1 can be moved out of the light path. The dashed line in the figure indicates the light path after P1 is moved away. P1 and P2 can be provided between S1 and S2, and can also be provided above S2. Herein, said light path means a light path formed after sunlight is converged by the converging system, and said "movable" is indicating that a component can be moved out of the light path from where it is arranged or be directly removed.

If the reflective surface is movable, the two solar energy utilization devices are respectively provided on the light paths formed before and after the reflective surface is moved, as shown in FIG. 1(b). When P2 needs to be used, s2 can be moved out of the light path. The dashed line in the figure indicates the light path after the reflective surface is moved away. P1 can be arranged between S1 and S2, and can also be arranged above S2.

Appropriate supporting components (not illustrated) can be used to support the converging system and the two solar energy utilization devices so as to maintain relative positional relations among them and meet movable requirement. Depending on specific scenarios of application, there can be various suitable forms of the supporting components, which can be designed as required. In some embodiments, a motion control device can also be included, which is configured to control according to a preset program the movable component in the system to move, so as to achieve some automatic handling process, such as timed cooking and automatic water heating.

As a preferred embodiment, the light-focusing refractive surface can be a toothed surface provided by a Fresnel lens. To facilitate understanding, relevant concepts are introduced below.

A Fresnel lens is a thin lens. The Fresnel lens is formed by dividing a continuous original curved surface of an ordinary lens into a number of segments, and placing the segments of curved surface on a same plane or same substantially smooth curved surface after the thickness of each segment is reduced. Such a discontinuous refractive surface evolved from the original curved surface can be called a Fresnel refractive surface, which is generally stepped or toothed. Theoretically, the Fresnel refractive surface has similar optical performance to the corresponding original curved surface, but has a greatly reduced thickness. A Fresnel refractive surface generated by an original curved surface (or part of the original curved surface) can be referred to as a Fresnel unit.

Figure 2:
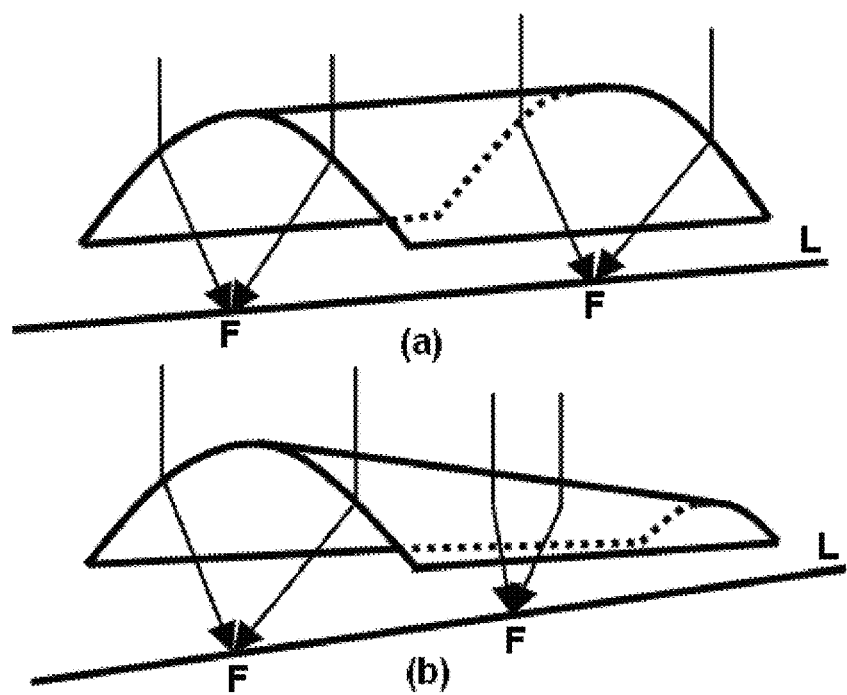
FIG. 2 is a schematic diagram of two types of coaxial surfaces for generating a Fresnel refractive surface in the present invention.

A traditional original curved surface for generating a Fresnel refractive surface is generally a curved surface symmetrical about an optical axis, such as a spherical surface, a paraboloid of revolution or other surface of revolution. Foci of the traditional original curved surface are located on one point, and thus called a "concurrent surface". In the present invention, the original curved surface can be a coaxial surface in any form, which can be specifically set as required in application. Said coaxial surface means a curved surface whose foci are located on a same straight line (but not necessarily on a same point), and the straight line is called a "coaxial line". A traditional concurrent surface can be regarded as a special example of a coaxial surface, the coaxial line of which regresses to a point. By using a coaxial but non-concurrent original curved surface, a sensing element to be provided at a focusing position can be expanded from a relatively small area (corresponding to the foci) to a strip (corresponding to the coaxial line composed of the foci), thereby improving signal collecting capability and being conducive to solving the problem of local overheat, without significantly increasing the cost. Typical coaxial surfaces include surfaces of revolution (including quadratic or high-order surfaces of revolution), columnar surfaces, tapered surfaces and the like. The columnar surfaces are also known as uniform-section coaxial surfaces. Regardless of the point where such a curved surface is cut along a direction perpendicular to its coaxial line, the shape and size of the resulting cross section are same. A cylindrical surface is a special example of a columnar surface. Cross sections of a tapered surface along its coaxial line have similar shapes but different sizes. A conical surface is a special example of a tapered surface. FIG. 2 shows the two types of coaxial surfaces described above, wherein a uniform-section coaxial surface is illustrated in FIG. 2(a), and a tapered coaxial surface is illustrated in FIG. 2(b), with foci F being located on their respective coaxial lines L.

A macroscopic refractive surface composed of one or more Fresnel units can be referred to as a toothed surface, and a substantially smooth or flat surface opposite thereto can be called a back surface. A toothed surface having only one Fresnel unit can be referred to as a "simple Fresnel refractive surface", and a toothed surface having two or more Fresnel units can be called a "composite Fresnel refractive surface". Generally, basic parameters (such as the area, the focal length, the shape of the corresponding original curved surface, and the number of concentric rings used for dividing the original curved surface) of the Fresnel units on the composite Fresnel refractive surface can be set flexibly to be all same, partially same or all different. In an embodiment, each Fresnel unit on the composite Fresnel refractive surface has its respective optical center, but their foci are located on a same point, or a same straight line, or a limited region. This can be achieved by spatial distribution of the Fresnel units forming the composite Fresnel refractive surface. It can be assumed that these Fresnel units are provided on a microscopic curved surface, such as a plane surface, quadratic surface (including a spherical surface, ellipsoidal surface, cylindrical surface, parabolic columnar surface, or hyperbolic columnar surface), a high-order polynomial curved surface (a general implementation of a non-spherical surface), or a bending surface or terraced surface formed by piecing a number of plane surfaces together.

The toothed surface and the back surface can be flexibly combined to form different types of elements. For example, a Fresnel lens with a toothed surface and a back surface can be referred to as a "simple Fresnel lens". Further, if the toothed surface is a "simple Fresnel refractive surface", such a lens is called a "single-side simple Fresnel lens"; and if the toothed surface is a "composite Fresnel refractive surface", such a lens is called a "single-side composite Fresnel lens". A Fresnel lens with toothed surfaces on both sides can be referred to as a "double-side Fresnel lens". Similarly, such lenses can be further classified into "double-side simple Fresnel lenses" and "double-side composite Fresnel lenses" according to the types of toothed surfaces. A double-side Fresnel lens, with one toothed surface being a simple Fresnel refractive surface, and the other toothed surface being a composite Fresnel refractive surface, can be referred to as a "double-side hybrid Fresnel lens". In addition, as a modification, if one of the toothed surfaces of a double-side Fresnel lens is a "simple Fresnel refractive surface", this toothed surface can be replaced by a traditional convex lens surface or convex lens surface.

Figure 3:
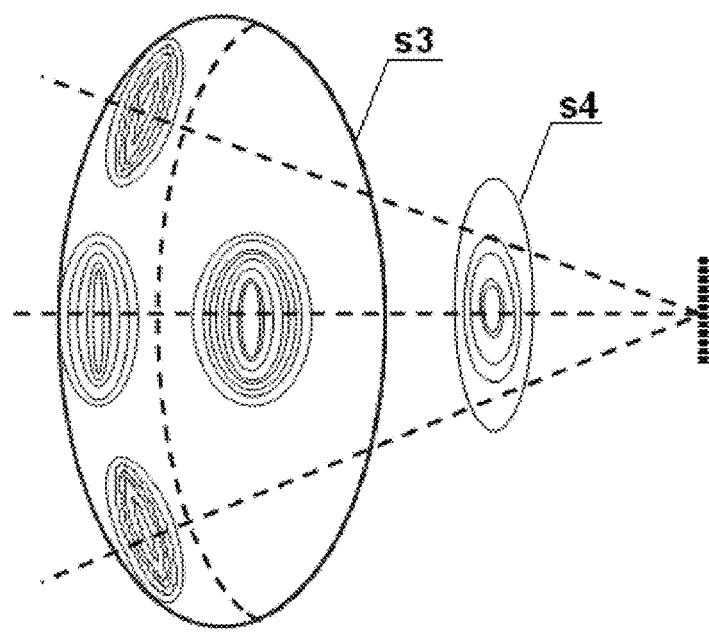
FIG. 3 is a schematic diagram of a converging system with two toothed surfaces in the present invention.

Providing two or more toothed surfaces on a same light path can ensure higher convergence capability of the converging system. FIG. 3 shows a converging system with two toothed surfaces, wherein a composite Fresnel refractive surface s3 and a simple Fresnel refractive surface s4 can be provided by one double-side Fresnel lens at the same time, and can also be provided by two single-side Fresnel lenses respectively.

The reflective surface for the converging system of the present invention can be a planar reflective surface or a curved reflective surface, such as a concave or convex reflective surface, and can also be a reflective surface in the shape of a toothed surface. The microscopic shape of the reflective surface can be similar to the shape of the light-focusing refractive surface(s) of the system, e.g. being a surface of revolution or a coaxial surface. The reflective surface can be provided by an element just having a single function of reflection, such as a flat plate with a reflecting film, and light rays are reflected directly on the surface of the element. The reflective surface can also be provided by a reflective lens. Said reflective lens means a lens with a reflecting film on one side. Light rays are refracted by a transmissive surface to enter the lens, and are then reflected by the reflective surface, and refracted again by the transmissive surface to exit the element.

Figure 4:
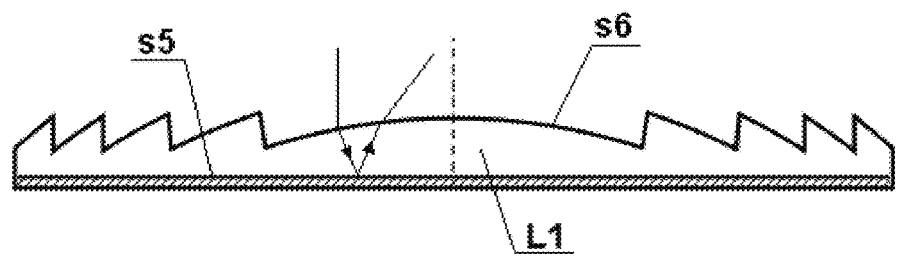
FIG. 4 is a schematic diagram of a Fresnel reflective lens in the present invention.

Different types of reflective lenses can be formed by flexible combinations of different types of reflective surfaces and different types of transmissive surfaces. Particularly, a Fresnel reflective lens can be formed by replacing one or more curved surfaces of the reflective lens with a corresponding toothed surface or corresponding toothed surfaces. Referring to FIG. 4 for a Fresnel reflective lens, an element L1 has a planar reflective surface s5 and a simple Fresnel refractive surface s6. Due to reflection, an incident light path passes through the physical refractive surface s6 twice, which physical surface is actually equivalent to two toothed surfaces, so the element L1 may also be referred to as a reflective double-side Fresnel lens. The element L1 can be formed by coating the back surface of a single-side Fresnel lens with a reflecting film or adhering a reflective patch with reflectance capability thereto. Other types of reflective lenses may also be formed by transforming any side of the original lens into a reflective surface. Using the reflective lens can simply and conveniently increase the number of light-focusing refractive surfaces in the light path, and reduce the manufacturing and installation costs.

Several use forms of the multifunctional solar energy system according to the present invention will be described below by way of examples in combination with specific scenarios of application.

Embodiment 1

Figure 5:
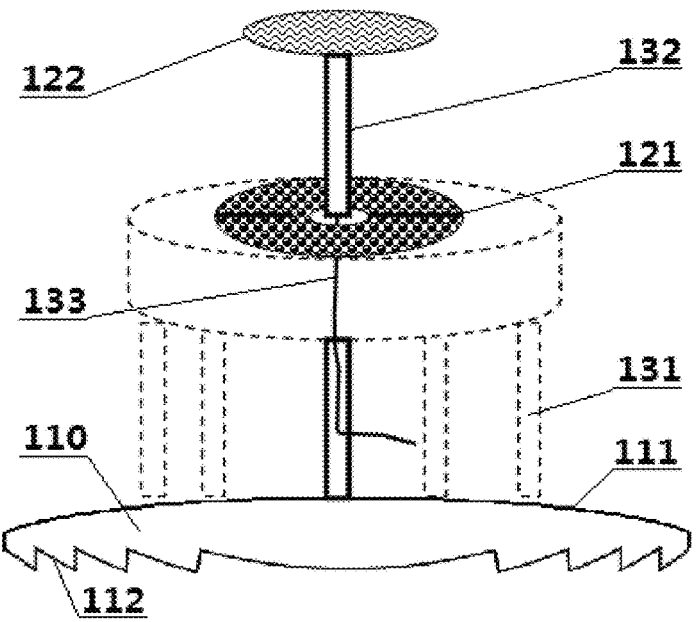
FIG. 5 is a schematic diagram of a multifunctional solar energy system of Embodiment 1.

Referring to FIG. 5 for an embodiment of the multifunctional solar energy system according to the present invention, it includes a Fresnel reflective lens 110 serving as a converging system, a first solar energy utilization device 121 and a second solar energy utilization device 122. The first solar energy utilization device is supported on a table 131, and the second solar energy utilization device is supported on a vertical post 132.

The Fresnel reflective lens 110 has a smooth and circumferentially symmetrical convex surface 111 and a toothed surface 112, wherein the convex surface 111 serves as a light-focusing refractive surface, and the toothed surface 112 is coated with a reflecting film to serve as a reflective surface. Physically, there is only one light-focusing refractive surface, but actually, sunlight is converged three times in the process of entering via 111, being reflected via 112 and exiting via 111".

In this embodiment, as the reflective surface and the light-focusing refractive surface are provided by the same physical element, and are not movable, the movable component is the first solar energy utilization device, which can be fixed or placed on the table 131. When the table is placed above the converging system, the first solar energy utilization device 121 is located in the light path for use, and when the table is moved out of the converging system, the second solar energy utilization device 122 is located in the light path to provide other function.

The two solar energy utilization devices can be of different types, e.g. being a solar heating device and a photovoltaic panel respectively. As the energy utilization efficiency of the solar heating device is much higher than that of the photovoltaic panel, thus when heating is needed, optical energy can be better used if the solar heating device is used directly than if solar energy is converted to electric energy which is then used for heating. In this embodiment, the first solar energy utilization device is a solar heating device, specifically a solar cooker, water heater, grill, roaster or the like. The second solar energy utilization device is a photovoltaic panel, and electric energy generated thereby is led out via a wire 133 concealed in the vertical post 132. It needs to be noted that the first solar device is movable and thus replaceable. For example, a solar cooker is used to make a fried dish, and then replaced by a water heater to boil water. The multifunctional solar energy system of the present invention includes two solar energy utilization devices, but is not limited to two, and can include multiple such devices.

As a preferred embodiment, the second solar energy utilization device, i.e. the one of the two solar energy utilization devices that is arranged above along a sunlight incident direction, is a double-side photovoltaic panel. The double-side photovoltaic panel arranged above can absorb incident sunlight at the front side and the back side, and can more fully utilize solar energy.

The converging system in this embodiment can be laid on the ground to become a light-focusing floor or floor tile, applicable to e.g. a courtyard of a dwelling house or a public area of a park. Based on the solar energy system of this embodiment, not only can outdoor power supply be provided, but also a tool for a picnic can be offered.

Embodiment 2

Figure 6:
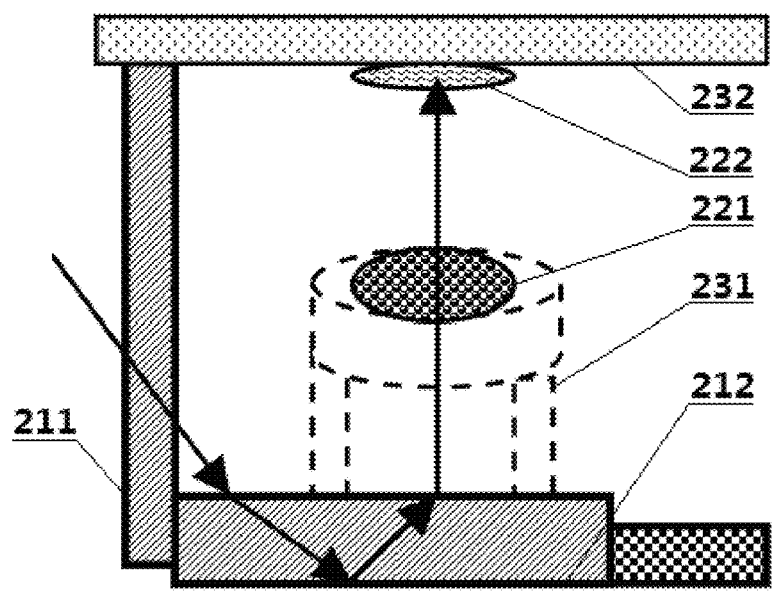
FIG. 6 is a schematic diagram of a multifunctional solar energy system of Embodiment 2.

Referring to FIG. 6 for another embodiment of the multifunctional solar energy system of the present invention, it differs from embodiment 1 mainly in that the application scenario is moved to an indoor one. The system includes a converging system, a solar heating device 221 and a photovoltaic panel 222. The converging system includes a light-focusing wall 211 and a reflective element 212. The solar heating device is supported on a table 231, and the photovoltaic panel is supported by a ceiling 232.

The light-focusing wall 211 can be built by a lens module with convergence capability, such as a light-focusing brick made of a Fresnel lens, which provides at least one light-focusing refractive surface. The reflective element 212 is laid on the ground, can be a planar light-reflecting floor, and can also be a Fresnel reflective lens similar to that in Embodiment 1, to provide further convergence capability.

In this embodiment, as the reflective element is provided on the ground, and not movable, the solar heating device 221 is fixed or placed on the movable table 231, and the photovoltaic panel 222 is fixed to the ceiling 232. The process of replacement for use is similar to that in Embodiment 1, and is not repeated here, but a power transmission line for the photovoltaic panel needs to be led out of a wall body along the ceiling.

The multifunctional solar energy system of this embodiment is suitable for indoor use, such as in a storied building or factory building, can maximally utilize solar energy radiated indoors, and is applicable to a dwelling house and also a factory with a need for heating, such as a food processing factory.

Embodiment 3

Figure 7:
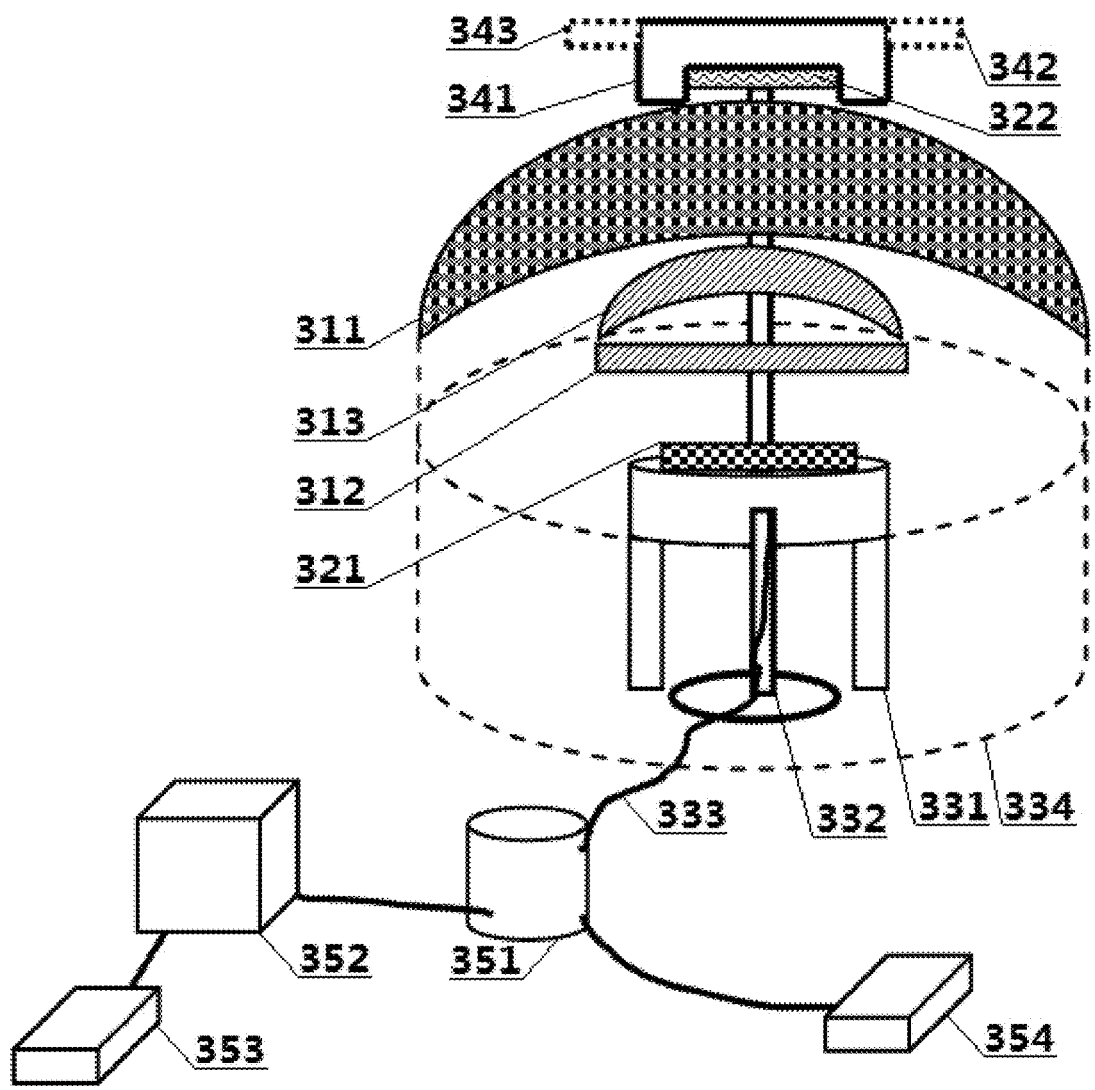
FIG. 7 is a schematic diagram of a multifunctional solar energy system of Embodiment 3.

Referring to FIG. 7 for a further embodiment of the multifunctional solar energy system of the present invention, it includes a converging system, a solar heating device 321 and a photovoltaic panel 322. The converging system includes a first Fresnel lens 311, a second light-focusing lens 313 and a reflective element 312. The solar heating device is supported on a table 331, and the photovoltaic panel is supported on a vertical post 332.

The converging system of this embodiment has a double convergence configuration, wherein the first Fresnel lens

311 is a single-side or double-side composite Fresnel lens, and the second light-focusing lens 313 is a convex lens or a Fresnel lens.

The reflective element 312 is movable. When the reflective element is located on the light path, the photovoltaic panel 322 is in the light path. When the reflective element is moved out of the light path, the solar heating device 321 is in the light path to provide direct heating function.

To more fully utilize the solar energy, this embodiment further includes a water tank 341 made of a transparent material. The photovoltaic panel 322, i.e. the one of the two solar energy utilization devices that is arranged above along a sunlight incident direction, is enclosed as a heat source by the water tank in a thermal conduction manner, e.g. being in close contact with a water heater via a thermally conductive material for heat exchange. Cold water enters the water heater via a water inlet 342, and flows out via a water outlet 343 after heat exchange with the photovoltaic panel.

The first Fresnel lens can be formed by pressing a flexible transparent material, such as a soft plastic or flexible crystal plate, can be used as a top surface of a tent or a top surface of an umbrella, and thus the embodiment can be regarded as an application scenario in which the solar energy system is used as an outdoor sunshade. Hanging hooks or holes (not shown) can be further provided at the periphery of the first Fresnel lens, for installing an enclosure tent 334, such that the solar energy system of this embodiment becomes a solar tent for dwelling. If the first Fresnel lens is made of a hard material and the enclosure tent 334 is replaced by an enclosure wall, this embodiment can be regarded as a roof solar energy system installed in a kitchen. In other embodiments, the solar heating device 321 can be further connected to an auxiliary heat source to ensure that cooking can also be performed during cloudy and rainy days.

To better store and utilize electric energy produced by solar energy conversion, this embodiment further includes additional elements listed below, and one or more of them can be selectively included in other embodiments as required in application.

An energy storage 351 is electrically connected to the photovoltaic panel 322 via a wire 333, for storing electric energy. The energy storage can be selected from a supercapacitor, a rechargeable battery and an air compressor.

An AC inverter 352 is electrically connected to the energy storage (may also be electrically connected directly to the photovoltaic panel in other embodiments), for converting a direct current output by the photovoltaic panel to an alternating current, such as 120V at 60 Hz or 220V at 50 Hz, and an AC wiring board 353 connected thereto can directly provide an AC output to a user.

A DC voltage output device 354 is electrically connected to the energy storage (may also be electrically connected directly to the photovoltaic panel in other embodiments), for outputting a direct voltage to be used by the user, and the magnitudes of the direct voltage output by the output device can, for example, include 12V, 9V, 5V, 3V, 1.5V and the like.

Embodiment 4

Figure 8:
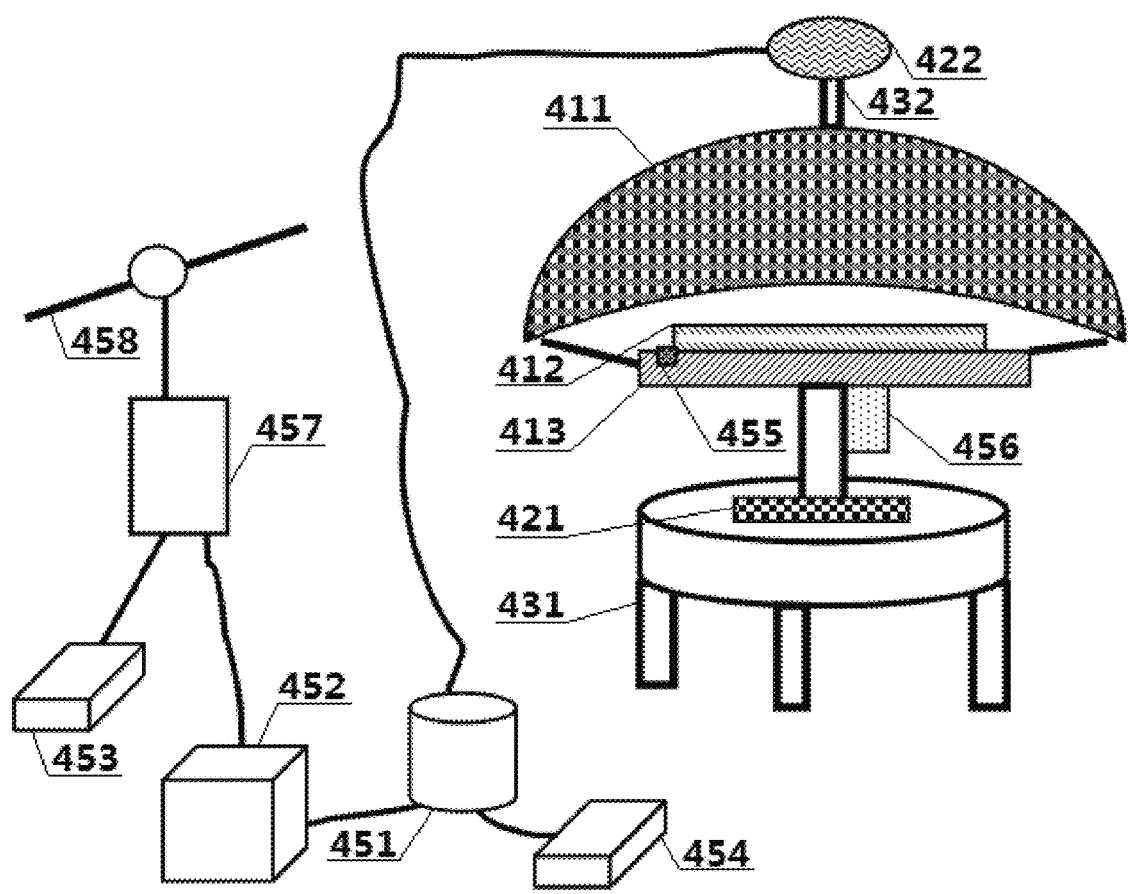
FIG. 8 is a schematic diagram of a multifunctional solar energy system of Embodiment 4.

Referring to FIG. 8 for a further embodiment of the multifunctional solar energy system of the present invention, it includes a converging system, a solar heating device 421 and a photovoltaic panel 422. The converging system includes a first Fresnel lens 411, a reflective element 412 and a second Fresnel lens 413. The solar heating device is supported on a table 431, and the photovoltaic panel is supported on a vertical post 432.

The converging system of this embodiment has a double convergence configuration, and the reflective element is arranged before the second Fresnel lens. The first Fresnel lens 411 is a single-side or double-side composite Fresnel lens, and can be used as a surface of a sunshade, similar to Embodiment 3; and the second Fresnel lens 413 is a composite or simple Fresnel lens. The converging system of this embodiment not only can achieve good shading effect, but also enables the photovoltaic panel 422 to, with its relatively small area, get most of optical energy radiated to the surface of the sunshade.

The reflective element 412 is movable. The solar heating device 421 and the photovoltaic panel 422 can be alternately used in a manner similar to that in Embodiment 3.

To achieve automatic alternate control, a motion control device (not shown) can also be included, which is configured to control according to a preset program the movable component in the system to move. For this embodiment, the reflective element can be mounted to a drive motor, and the reflective element is moved into or out of the light path according to the preset program. Said preset program can be configured as required in the scenario. For example, for an automatic cooking application, the control program of the drive motor can cooperate with an automatic cooking program. After a material to be heated is put onto the solar heating device, the reflective element is controlled to move away for heating, and after the material is taken out, the reflective element is controlled to return so as to continue with power generation. Said preset program can also be used for control according to environmental and system parameters acquired in real time, such as light intensity or temperature. For example, it can be configured to control the reflective element to move away when light intensity is high, such as at noon in midsummer, at which time the heating device can perform heating operation that needs a high power, such as desalination of sea water; and to control the reflective element to return to continue with power generation when light intensity becomes lower, thus being conducive to reducing the temperature of the photovoltaic panel and prolonging its service life. In this embodiment, a temperature and light intensity detector 455 is mounted at an edge of the second Fresnel lens, to provide parameters for intelligent control.

With respect to the additional elements, in addition to an energy storage 451, an AC inverter 452, an AC wiring board 453 and a DC voltage output device 454 similar to those in Embodiment 3, this embodiment also includes:

a state indicator 456 configured to detect and display operating parameters of the system, which can be voltage, current, power, temperature and the like, so that the user can know the operating state of the solar energy system; these parameters can be obtained by providing detecting devices corresponding to parameter types required, such as a temperature probe; and an intelligent control program of the movable component can be integrated with the state indicator.

In addition, the AC inverter 452 of this embodiment also connects a power output to a grid connection switchgear 457 (so the AC wiring board 453 is led out from the grid connection switchgear), which is connected to an external AC grid 458, so that electric energy generated by the solar energy system can be introduced to the external grid, so the system of this embodiment can also serve as a solar power station.

The principle and embodiments of the present invention are described above by using specific examples. It should be understood that the above embodiments are merely used for facilitating understanding of the present invention, and should not be construed as limiting the present invention.

Those of ordinary skill in the art can make modifications to the specific embodiments described above, based on the concept of the present invention.

The invention claimed is:

1. A multifunctional solar energy system, comprising:
   a converging system comprising at least one light-focusing refractive surface and one reflective surface, which is arranged below the light-focusing refractive surface along a solar incident direction; and
   two solar energy utilization devices for absorbing and utilizing sunlight;
   wherein at least one of the reflective surface and the two solar energy utilization devices is removable from the light path;
   when the reflective surface is removable, the two solar energy utilization devices are respectively provided on the light paths formed before and after the reflective surface is removed; and
   when the reflective surface is fixed, the two solar energy utilization devices are alternatively provided on the light path after the reflective surface.

2. The solar energy system of claim 1, wherein the at least one light-focusing refractive surface is a toothed surface and comprises at least one Fresnel unit.

3. The solar energy system of claim 2, wherein the shape of the toothed surface and/or a microscopic curved surface of the reflective surface is a surface of revolution or a coaxial surface.

4. The solar energy system of claim 2, wherein the converging system comprises a first Fresnel lens and a reflective element, wherein
   the type of the first Fresnel lens is selected from a single-side simple Fresnel lens, a simple composite Fresnel lens, a double-side simple Fresnel lens, a double-side composite Fresnel lens and a double-side hybrid Fresnel lens; and
   the type of the reflective element is elected from a reflective element with only a single reflective plane surface or reflective curved surface, a plane reflecting mirror, a reflective lens formed by a combination of a planar reflective surface and a concave or convex transmissive surface, and a Fresnel reflective lens.

5. The solar energy system of claim 1, further comprising a motion control device configured to control according to a preset program the removable component in the system to move.

6. The solar energy system of claim 1, wherein the type of each of the two solar energy utilization devices is selected from one of a solar heating device and a photovoltaic panel respectively.

7. The solar energy system of claim 6, wherein the type of at least one of the two solar energy utilization devices is a photovoltaic panel, and the system further comprises one or more of the following elements:
   an energy storage electrically connected to the photovoltaic panel, for storing electric energy, the energy storage is selected from a super-capacitor, a rechargeable battery and an air compressor;
   an AC inverter electrically connected to the photovoltaic panel, for converting a direct current output by the photovoltaic panel to an alternating current;
   a DC voltage output device electrically connected to the double-side photovoltaic panel, for outputting a DC voltage; and
   a state indicator for detecting and displaying operating parameters of the system, the operating parameters being selected from voltage, current, power and temperature.

8. The solar energy system of claim 1, wherein the one of the two solar energy utilization devices that is arranged above another along a direction in which a sunlight is incident is a double-side photovoltaic panel.

9. The solar energy system of claim 1, further comprising a water tank made of a transparent material, and the one of the two solar energy utilization devices that is arranged above another along a direction in which a sunlight is incident is enclosed as a heat source by the water tank in a thermal conduction manner.

10. The solar energy system of claim 1, at the periphery of the light-focusing refractive surface or the reflective surface, hanging hooks or holes are provided to install an enclosure tent.

* * * * *